INVENTOR.
Joseph Gallo Sr.
BY
Hansen and Lane
His Attorneys.

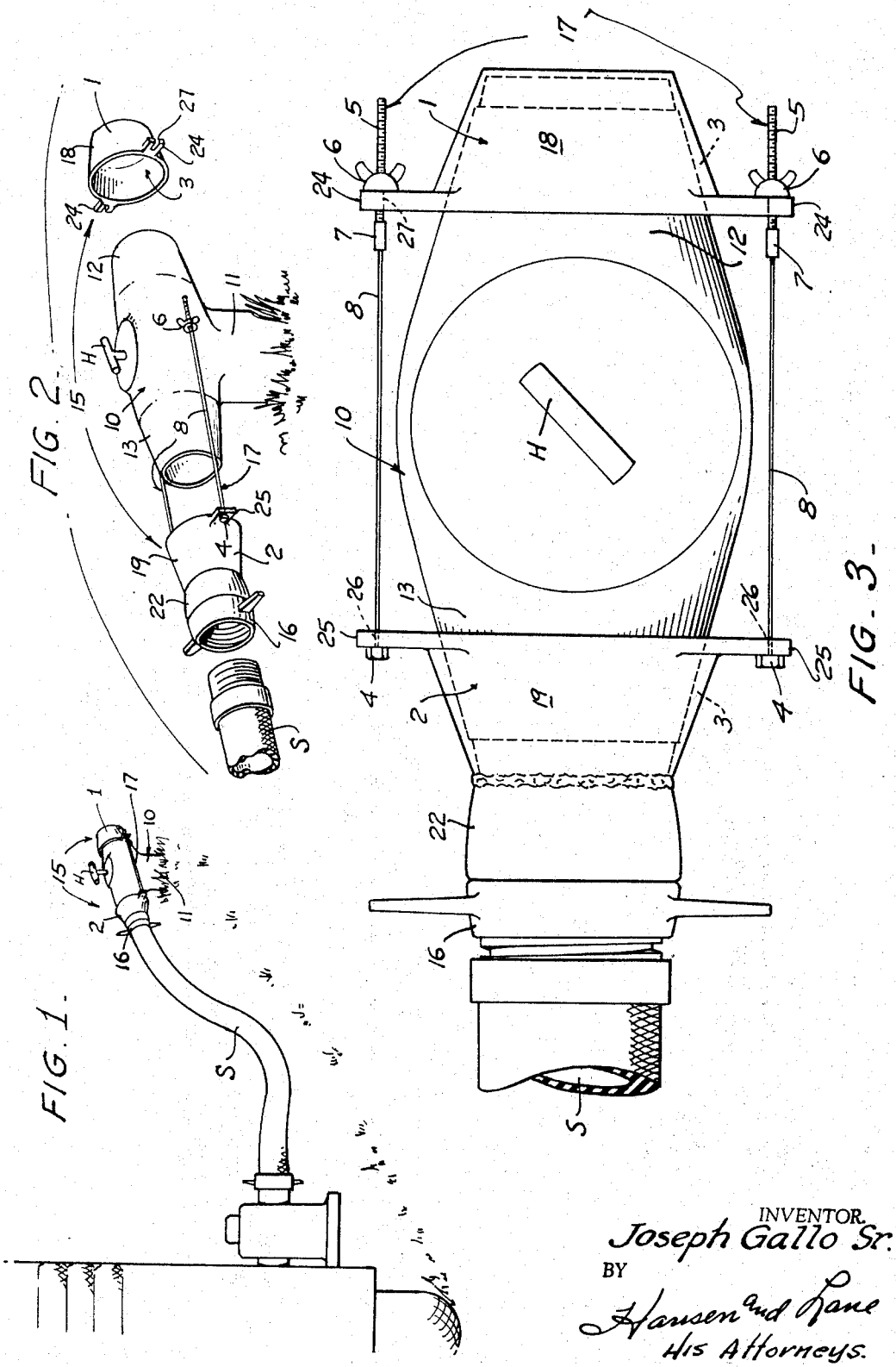

INVENTOR.
Joseph Gallo Sr.
BY
Hansen and Lane
HIS ATTORNEYS.

United States Patent Office 3,363,640
Patented Jan. 16, 1968

3,363,640
FIRE PROTECTION DEVICE FOR USE WITH FURROW VALVES
Joseph Gallo, Sr., Soledad, Calif. 93960
Filed Feb. 25, 1965, Ser. No. 435,378
5 Claims. (Cl. 137—272)

ABSTRACT OF THE DISCLOSURE

A device for quickly connecting a hard suction hose of the pump of fire fighting apparatus to an irrigation furrow valve. A tapered cap and a tapered sleeve and means for mounting them on diametrically opposed spouts of a furrow valve, the sleeve having a female swivel hose connector adapted for threading on a hard suction hose.

---

This invention relates to fire protection devices and more particularly to a device for converting a furrow valve for use with the hard suction hose of the pumper of fire fighting apparatus.

All fire department equipment have a pressure pump adapted to be connected to a conventional fire hydrant in a well known manner. In rural districts where there are no fire hydrants it is customary to lay the open end of the hard suction hose of the pumper in a body of water. Such body of water might be a ditch, a storage tank, a reservoir or a swimming pool. In other words, any source from which water might be drawn via the hard suction hose. Among sources of water most rural districts have irrigation outlets either privately or district owned. Such outlets are known as furrow valves which have spouts by which water is poured directly into irrigation ditches and/or trenches for gravitation over a planted field for irrigating the same. Fire fighters often use these furrow valves because they are the closest source of water to the fire. However, they must first allow the water to pour into a ditch or receptacle to a sufficient depth to serve the open end of the hard suction hose of the pumper.

The present invention has as its principal object the provision of a device for adapting and/or converting such well known furrow valve hydrants for threaded connection to the open end of a hard suction hose.

It is another object of this invention to provide a simple yet effective means for quickly and readily connecting the threaded end of a hard suction hose to such furrow valves for immediately receiving water therefrom.

Another object is to provide a means for capping one spout of a furrow valve while serving to provide an anchorage for a tensioning means by which to draw and tightly seal a swivel connector onto the other spout of such furrow valve.

It is yet another object of this invention to provide a cap and hose connector sleeve configurated to have a watertight fit upon diametrically opposite tapered spouts of a furrow valve with tensionable means for drawing such cap and sleeve together upon such spouts.

These and other objects and advantages of the present invention will become apparent from a reading of the following description in the light of the accompanying drawings in which:

FIG. 1 is a fragmentary illustration of a pumper connected to a furrow valve by means of the converter of the present invention.

FIG. 2 is an exploded perspective view showing the parts of the converter of FIG. 1 about to be connected to the furrow valve.

FIG. 3 is a plan view of the converter attached to the furrow valve as in FIG. 1 and at larger scale with respect thereto.

Referring to FIGS. 1, 2 and 3 of the drawings the conventional furrow valve generally designated 10 consists of a standpipe 11 which come up through the surface of the earth from an underground pipe or main coming from a reservoir, tank or other supply at a higher elevation or any other source of pressurized water. The standpipe usually has diametrically opposed spouts 12 and 13 communicating therewith and a valve means beneath the level of the spouts operable by a handle or key H to control, open or stop the flow of water from the standpipe 11 into and through the spouts 12 and 13.

The spouts 12 and 13 are tapered to readily fit irrigation pipes or flumes by which the water can be conveyed long distances to a place where it is required.

Figure 4:
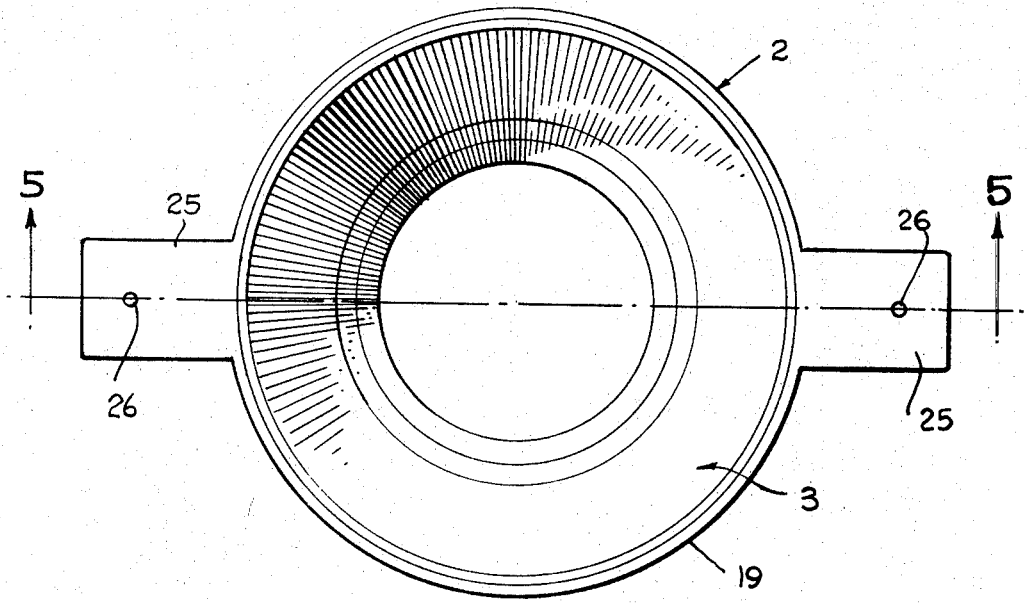
FIG. 4 is an open end view of the hose connecting end of the converter of FIGS. 1, 2 and 3.
Figure 5:
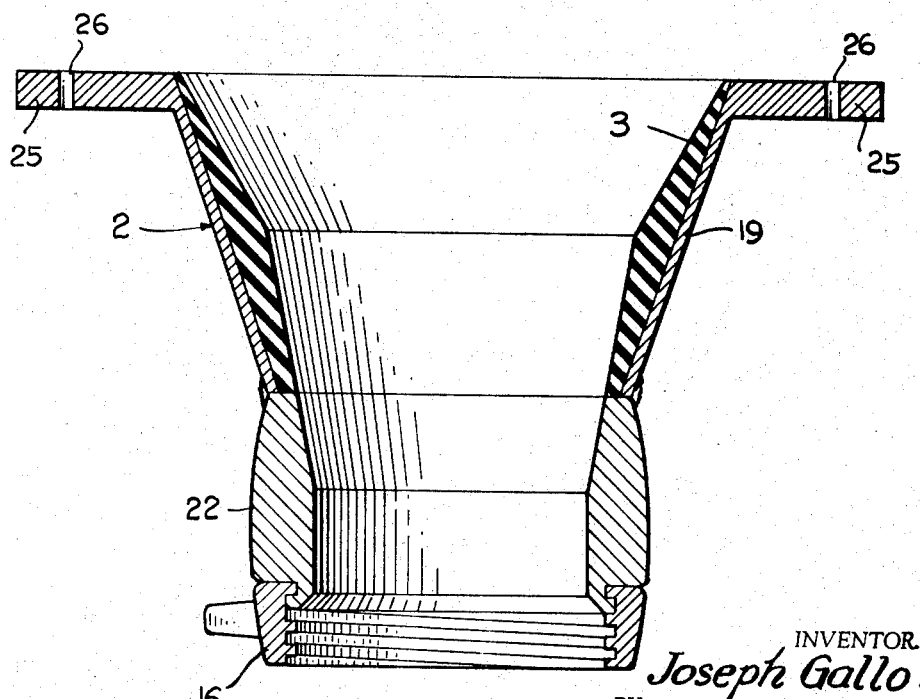
FIG. 5 is a section through FIG. 4 taken along line 5—5 thereof.
Figure 6:
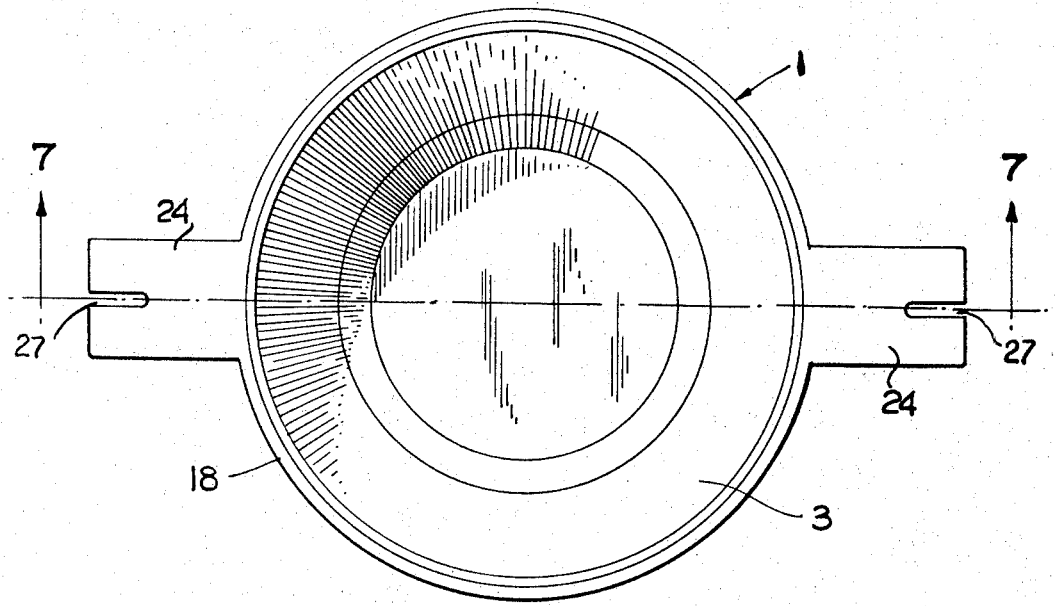
FIG. 6 is an open end view of the cap end of the converter of FIGS. 1, 2 and 3.
Figure 7:
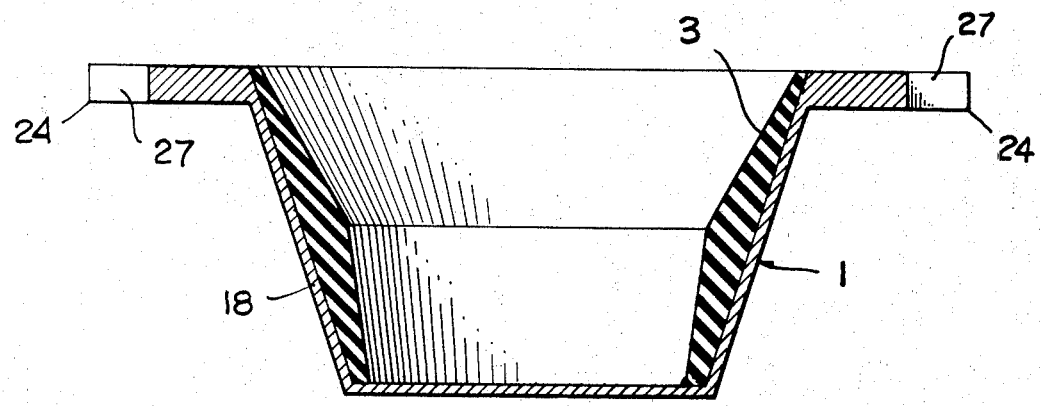
FIG. 7 is a section through FIG. 6 taken along line 7—7 thereof.

The present invention is embodied in a device generally designated 15 comprising a cap 1 (FIGS. 6 and 7); a connecting sleeve 2 (FIGS. 4 and 5) having a female swivel hose connector 16 at its open end; and means 17 by which to secure the cap 1 and connecting sleeve 2 to the furrow valve 10.

More specifically and in detail the cap 1 and sleeve 2 each have a frusto-conical portion 18 and 19, respectively, contoured to fit the tapered spouts 12 and 13. Each cap 1 and sleeve 2 is preferably provided with a resilient hard rubber lining 3 of such configuration as to provide a pressurized watertight seal between the spouts 12 and 13 and the respective frusto-conical portions of the cap and sleeve.

The cap 1 is closed at its end of smallest diameter to seal off the flow of water from the tapered spout upon which it is mounted.

The sleeve 2 has its reduced open end welded, brazed or otherwise suitably secured to a mounting 22 for the swivel hose connector 16 mentioned above. This swivel connector 16 has an inside or female thread adapted for threaded connection to the male end of a conventional hard suction hose S of the type used on all fire equipment.

With the cap 1 and sleeve 2 pressed onto opposite spouts 12 and 13 of a furrow valve 10 the means 17 is connected to the cap and sleeve to draw them together and tightly upon the spouts of the furrow valve.

In the present disclosure I have shown the means 17 by way of example to be a pair of cables 8 extending between diametrically opposite ears 24 and 25 on the cap 1 and sleeve 2, respectively. The ears 25 on the sleeve 2 are provided with holes 26 and the ears 24 on the cap 1 are provided with slots 27 which open laterally to the sides of the cap. Each cable 8 has a head 4 disposed to engage the ears 25 where the cables pass through the holes 26. The opposite ends of the cables 8 have a connecting sleeve secured thereto from which extends a threaded portion 5 adapted to slip into the slots 27 and a wing nut 6 on each threaded portion 5 serves to tighten up the cables and draw the cap 1 and sleeve 2 tightly onto the tapered spouts 12 and 13 of the furrow valve 10.

It should be apparent that the connecting means 17 may be of various forms of tensionable means such as arms hinged to the ears 25 of the sleeve 2 to swing into the slots 27 in the ears 24 of the cap 1 for threaded securing by a wing nut as the one 6 explained to draw the cap and sleeve onto the spouts. Other forms may includes a toggle lever of well known design which will quickly snap over center to apply sufficient tension to such connecting arms to draw the cap and sleeve securely onto the opposing spouts.

Once the converter of the present inventon is properly secured to the furrow valve as above explained and the male open end of the hard suction hose S secured by the female swivel connector 16, the key H of the valve 10 can be turned on to open flow condition. Thereupon water will flow into the hard suction hose S and go directly to the pumper to which it is attached without loss of water or time.

The device 15 can be made to fit any and all sizes of furrow valves and/or standard fire fighting equipment as required in various districts. Water immediately supplied from irrigation furrow valves by the use of the devices made in accordance with the present invention will provide people and farmers in rural districts with fire protection for their homes, barns, garages, corn cribs, hay lofts and the like and thereby place them in a lower rate for insurance on their properties.

While I have described the device for converting furrow valves for use with fire fighting equipment in specific detail, it will be appreciated by those skilled in the art that it is susceptible to modification, alteration and/or variation without departing from the spirit of my invention. I therefore desire to avail myself of all modifications, alterations and/or variations as fairly come within the purview of the appended claims.

What I claim as new and desire to protect by Letters Patent is:

1. A device for converting the spouts of a furrow valve for direct flow connection to the threaded open end of a pumper hard suction hose of fire fighting equipment comprising means for capping one spout of such furrow valve, a sleeve mountable on the other spout of such furrow valve including a female swivel for threaded connection to the threaded open end of a hard suction hose, and tensionable means between said sleeve and means for capping said one spout for drawing them into water tight sealing relation to said spouts.

2. The combination with a furrow valve of the type having diametrically opposite tapered spouts of means for connecting said furrow valve to the threaded open end of a hard suction hose of a fire fighting pumper comprising a cap tapered to fit one of such spouts, a sleeve tapered to fit the opposite one of said spouts, a female swivel hose connector secured to the open end of said sleeve for threaded connection to the threaded open end of a hard suction hose, each said cap and sleeve having diametrically extending ears aligned with the ears of each other, and tensionable means extending between the respective ears on each side of said cap and sleeve for drawing them together onto the respective tapered spouts of such furrow valve.

3. The device according to claim 2 in which said tensionable means comprises a pair of cables each having one end anchored to one of the diametrically opposite ears of said sleeve and its opposite end threaded and engaging the aligned ear of said cap, and means on the threaded end of each of said cables for tensioning the latter to draw said cap and sleeve together onto the tapered spouts of said furrow valve.

4. The combination with a furrow valve of the type having diametrically opposite tapered spouts of means for connecting said furrow valve to the threaded open end of a hard suction hose of a fire fighting pumper comprising a cap tapered to fit one of such spouts, a sleeve tapered to fit the opposite one of said spouts, each said cap and sleeve having a resilient lining for sealingly engaging the tapered spout on which it is mounted, a female swivel hose connector secured to the open end of said sleeve for threaded connection to the threaded open end of a hard suction hose, each said cap and sleeve having diametrically extending ears aligned with the ears of each other, and tensionable means extending between the respective ears on each side of said cap and sleeve for drawing them tightly together whereby to effect a water tight seal between the resilient linings thereof and the respective tapered spouts of such furrow valve.

5. The device according to claim 4 in which said tensionable means comprises a pair of cables each having one end anchored to one of the diametrically opposite ears of said sleeve and its opposite end threaded and engaging the aligned ear of said cap, and means on the threaded end of each of said cables for tensioning the latter to draw said cap and sleeve together and effect a water tight seal between the resilient lining of said cap and sleeve and the respective tapered spout upon which it is mounted.

References Cited

UNITED STATES PATENTS 2,768,642  10/1956  Sherman et al. _____ 137—321
3,010,736  11/1961  Dilley _____ 285—114

WILLIAM F. O'DEA, *Primary Examiner.*

R. GERARD, *Assistant Examiner.*